United States Patent [19]
Okabe et al.

[11] Patent Number: 5,343,447
[45] Date of Patent: Aug. 30, 1994

[54] SELF-COOLING OPTOMAGNETIC DISK DEVICE WITH LOCKING INTERNAL MECHANISM

[75] Inventors: Satoshi Okabe, Hachioji; Sunao Aoki, Highashimurayama, both of Japan

[73] Assignee: Olympus Optical Co., Ltd., Tokyo, Japan

[21] Appl. No.: 704,106

[22] Filed: May 22, 1991

[30] Foreign Application Priority Data

May 23, 1990 [JP] Japan .................... 2-131130
May 23, 1990 [JP] Japan .................... 2-131131
May 25, 1990 [JP] Japan .................... 2-133881

[51] Int. Cl.$^5$ .................................. G11B 11/00
[52] U.S. Cl. .................................. 369/13; 369/14; 369/44.11; 369/44.19; 369/44.15
[58] Field of Search ............ 369/13, 14, 44.11, 44.19, 369/44.15; 357/81

[56] References Cited

U.S. PATENT DOCUMENTS

| | | | |
|---|---|---|---|
| 5,027,334 | 6/1991 | Yamanaka et al. | 369/13 |
| 5,049,982 | 9/1991 | Lee et al. | 357/81 |
| 5,060,207 | 10/1991 | Kaneda et al. | 369/13 |

*Primary Examiner*—Robert J. Pascal
*Assistant Examiner*—Reginald A. Ratliff
*Attorney, Agent, or Firm*—Stevens, Davis, Miller & Mosher

[57] ABSTRACT

An information recording apparatus has first and second openings arranged near a field coil and flow guides beside the openings, so that an air current generated by a rotation of the medium is circulated through a space between a field coil and the information recording medium, as well as a space formed on an upper portion of said field coil. In the apparatus, an optical pick up is locked with respect to reckless stoppers with a space. Also, a field holder is arranged to be separated from a cassette case holder, but when the cassette case holder is moved in a horizontal direction and then in a perpendicular direction to be mounted on a turn table, the field holder is made to face the information recording medium. This arrangement prevents overheating and improves durability.

23 Claims, 11 Drawing Sheets

FIG_1

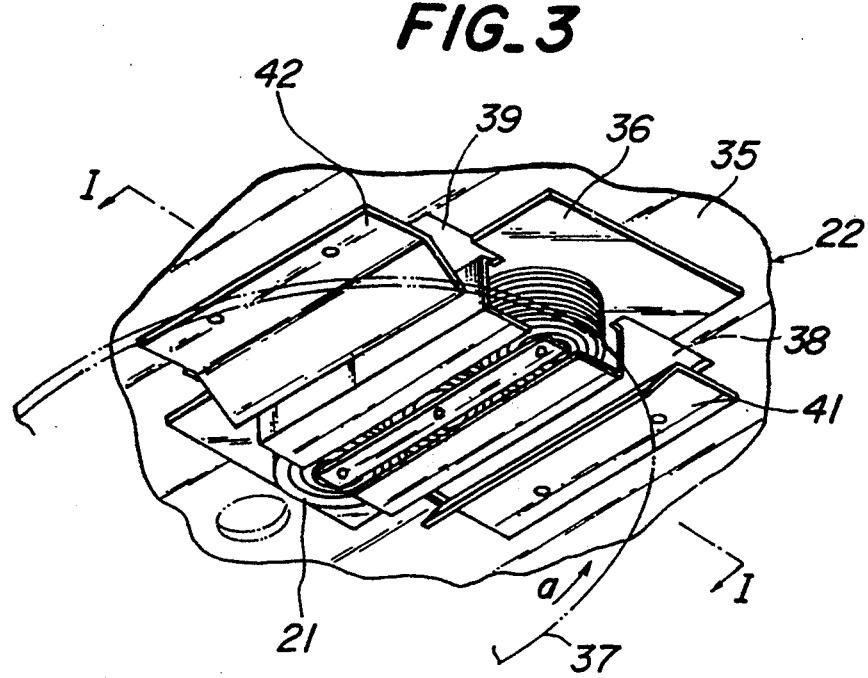
FIG_3
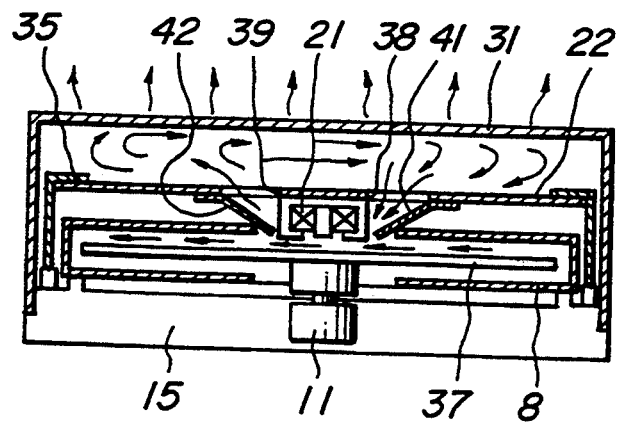
FIG_4

FIG._5
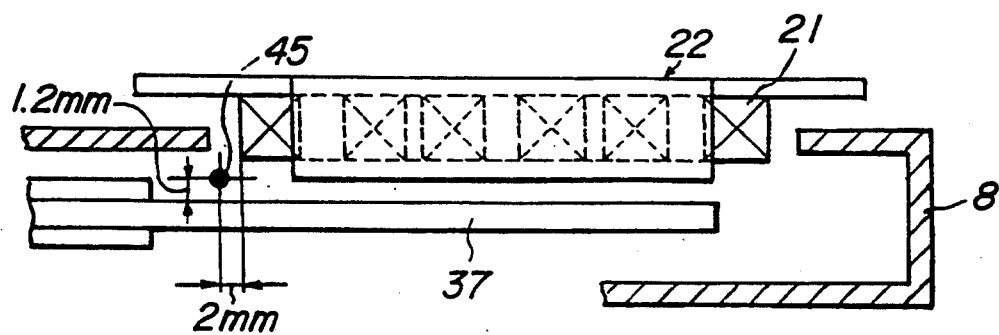
FIG._6
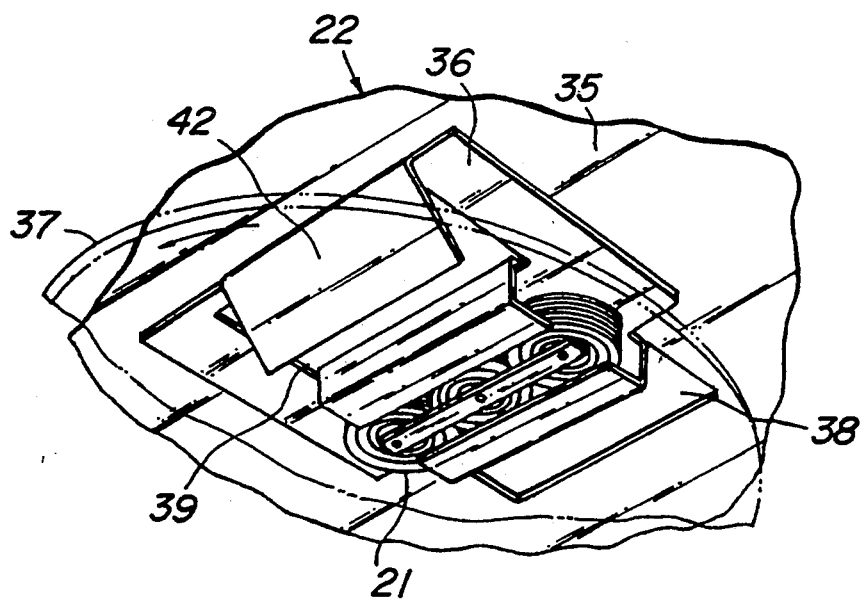

FIG_7
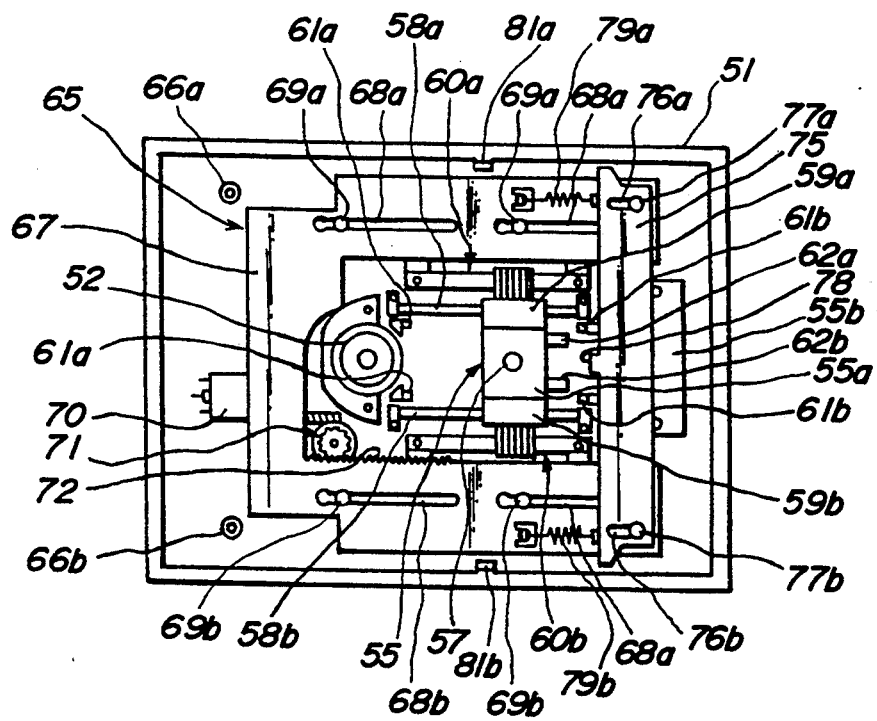
FIG_8
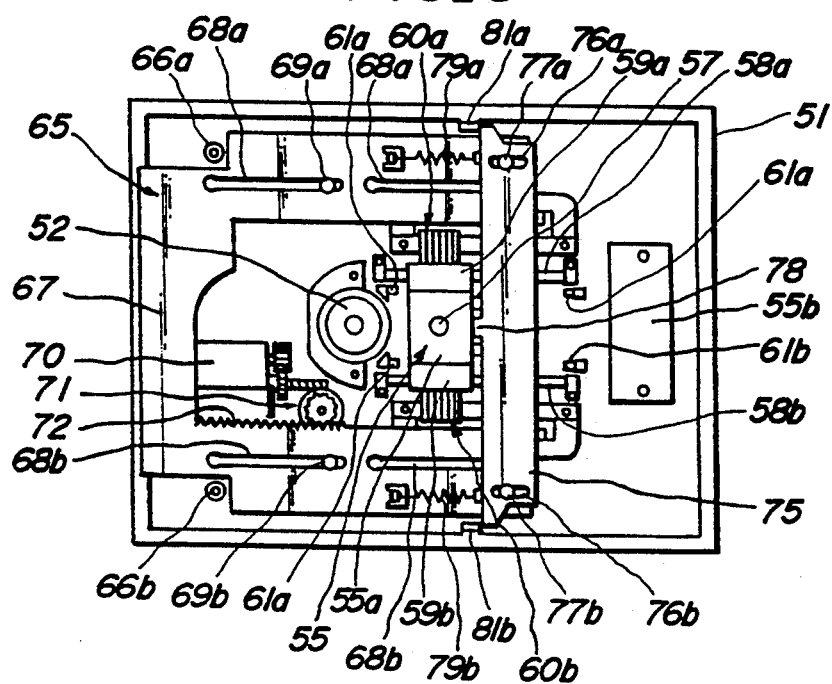

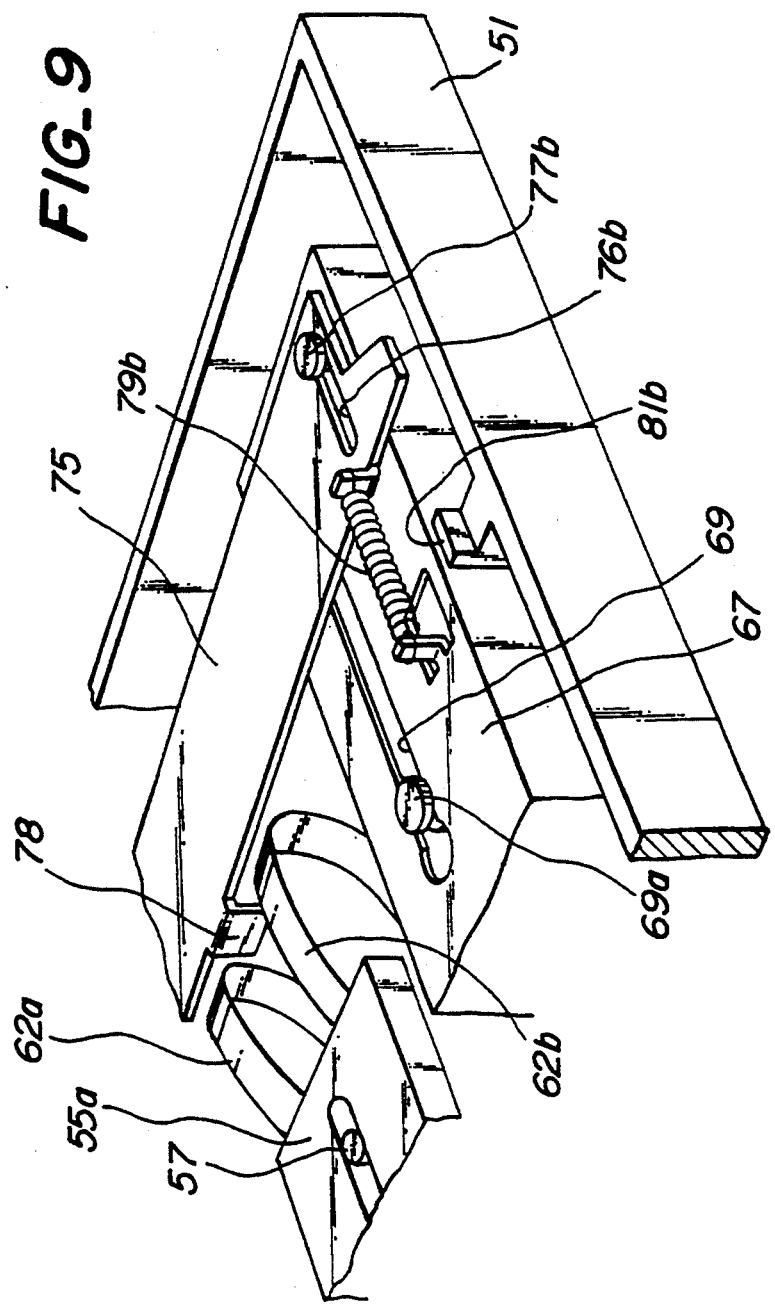

FIG_10
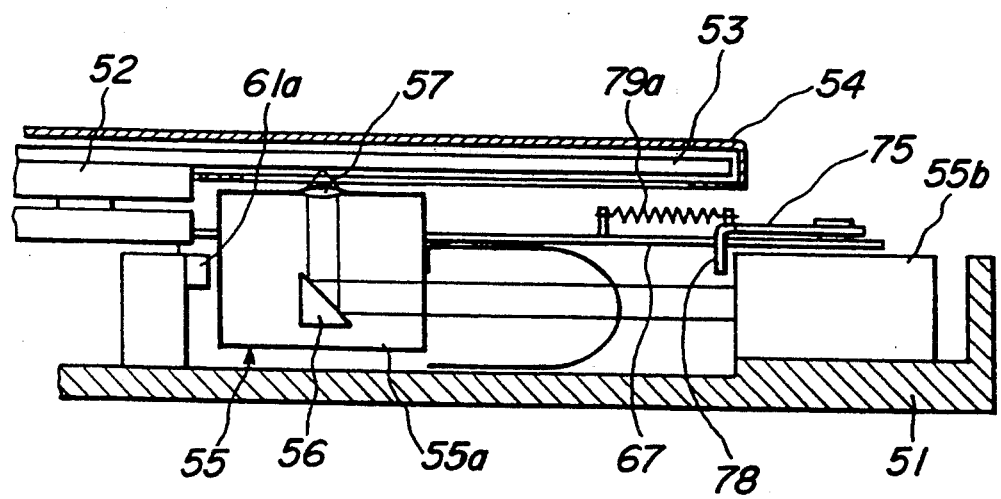
FIG_11
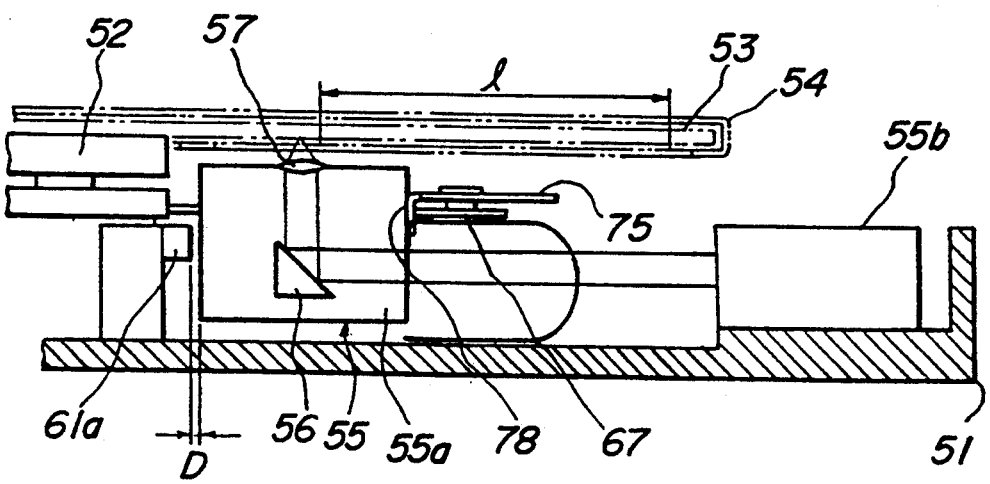

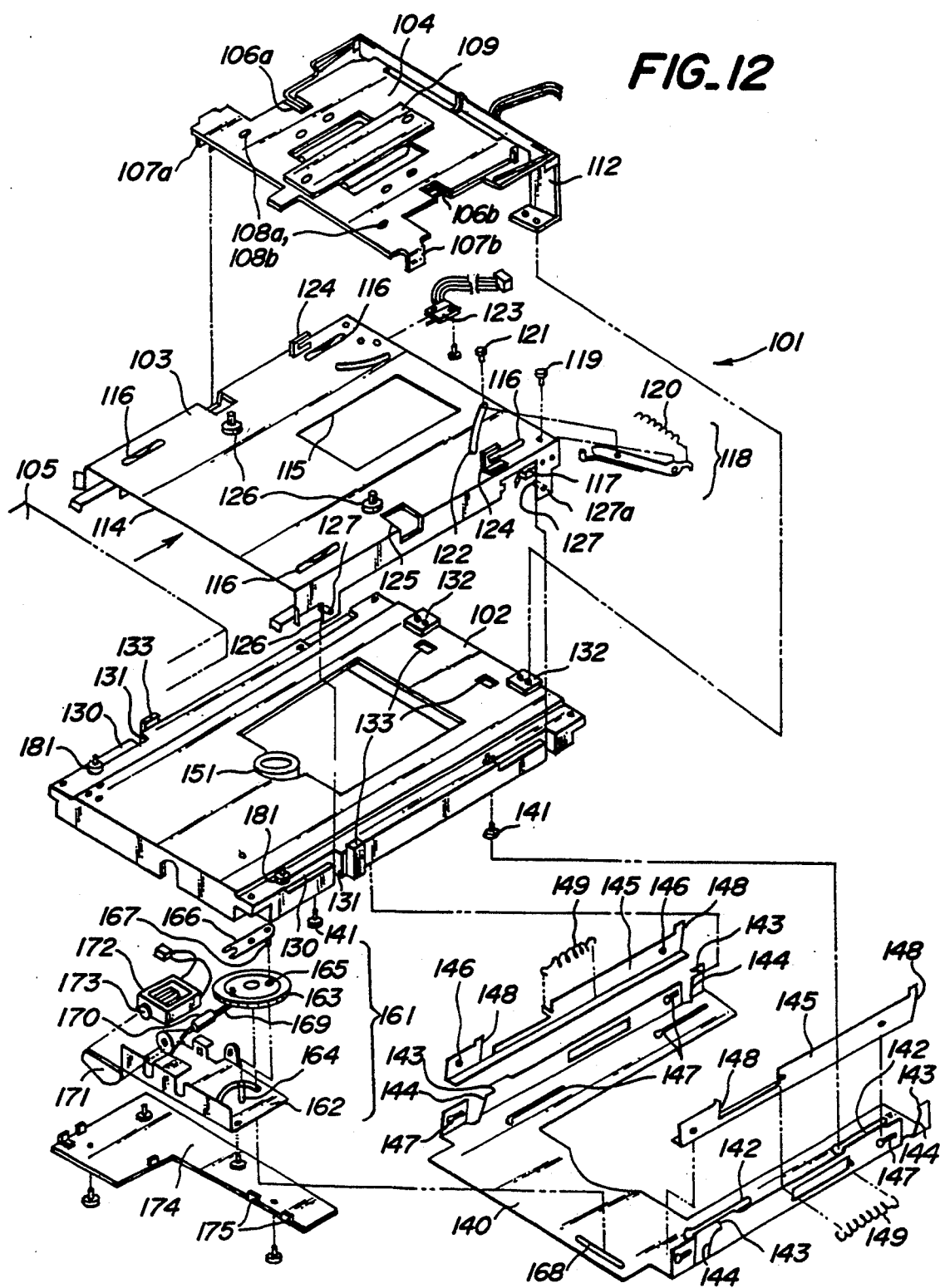
FIG_12

FIG_14A
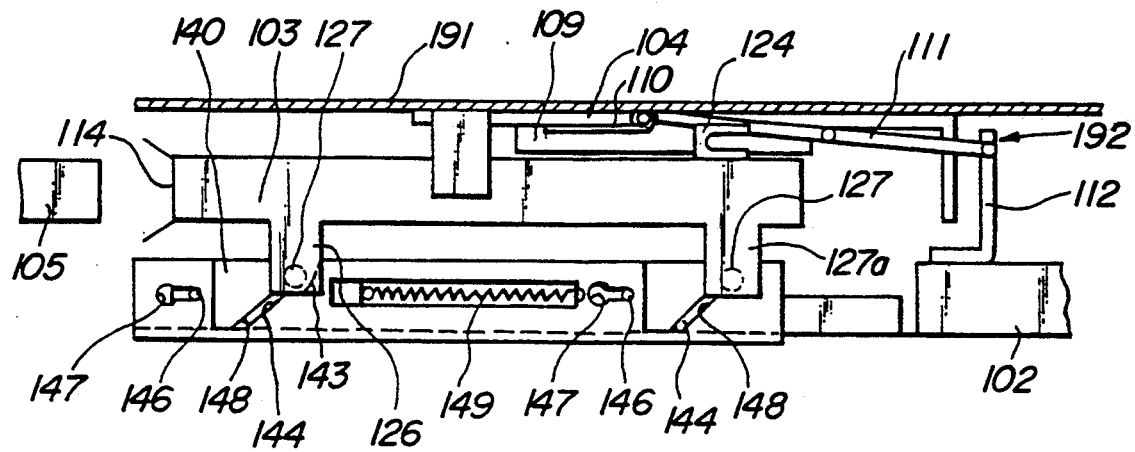
FIG_14B
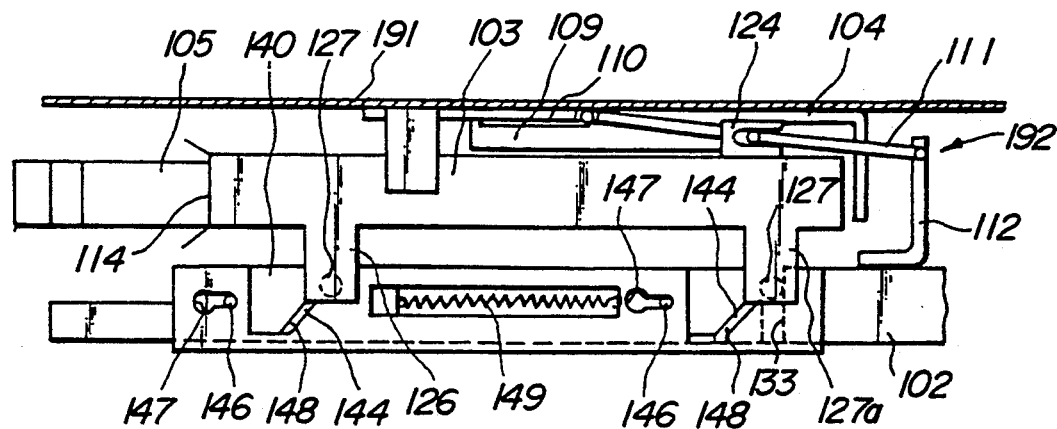
FIG_14C
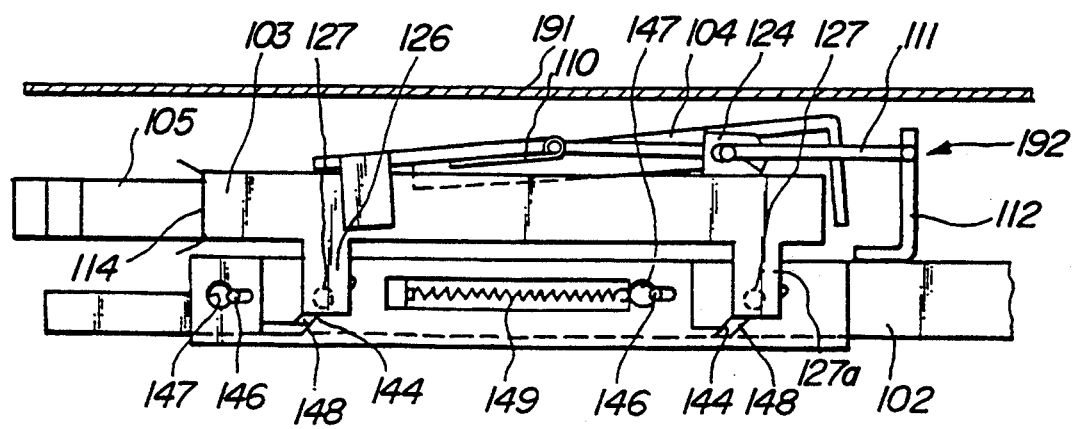

FIG_14D
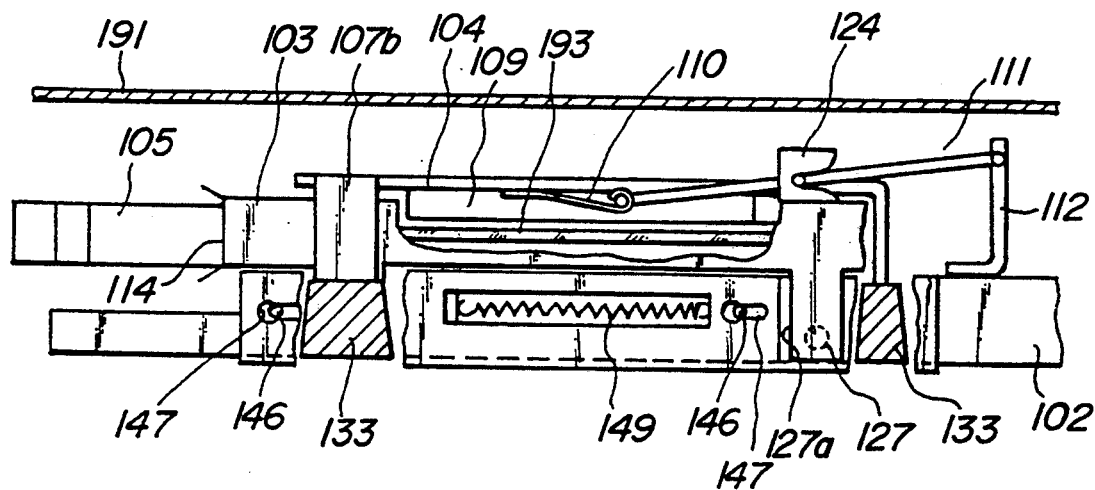
FIG_14E
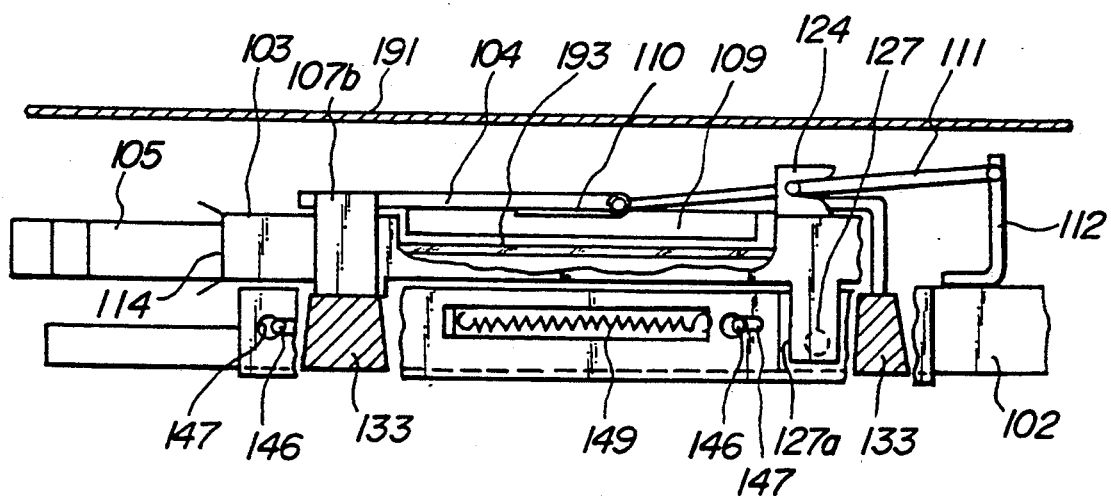

SELF-COOLING OPTOMAGNETIC DISK DEVICE WITH LOCKING INTERNAL MECHANISM

BACKGROUND OF THE INVENTION

1. Field of the Invention

The present invention relates to an apparatus for an information recording medium, such as an optical disc, an optical card and an opto-magnetic disc. In the apparatus according to the invention, the information recording medium contained in a cassette case is set up to record, erase and reproduce information on and from the information recording medium.

2. Prior Art Statement

Hitherto, there have been suggested various kinds of apparatus for an opto-magnetic disc; in the apparatus a field coil for recording, erasing and reproducing information is arranged so as to face the surface of the opto-magnetic disc. In such apparatus, when an electric current is supplied to the field coil, the temperature of the opto-magnetic disc is increased by the heat generation of the field coil. In such case, it would be impossible to record, erase and reproduce information on and from the disc correctly. Therefore, the apparatus is arranged such that an outside air is taken inside thereof, for instance, by means of a fan in order to cool the opto-magnetic disc; or arranged such that the number of turns of the field coil is increased to make a value of the electric current in the field coil small in order to decrease the heat generation in the field coil.

However, in the construction of the conventional apparatus such that the opto-magnetic disc is cooled by taking outside air into the apparatus, there is a drawback namely that dust, which comes from the outside, adheres to the opto-magnetic disc or optical members constituting an optical head; and thus information cannot be recorded, erased and reproduced in a correct and stable manner due to the reason that the amount of light is decreased by the dust adhering to the optical members. On the other hand, in the construction such that the heat generation is depressed by increasing the number of turns of the field coil, there is a drawback in that the size of the field coil becomes large so that the apparatus as a whole also becomes large and heavy.

In order to solve these drawbacks, in Japanese Patent Preliminarily Publication No. 1-171144, there is disclosed an improved apparatus, in which under the condition that an opto-magnetic disc is loaded on the apparatus, a fan is arranged on a spindle motor, which is for rotating the opto-magnetic disc, via the opto-magnetic disc and a magnet. An air current is generated in the apparatus by the fan, which is rotated integrally with the spindle motor, so that the field coil is cooled.

However, in the construction that the fan is arranged on the spindle motor, since too much load is generated in the spindle motor, the rotation accuracy is decreased and then information cannot be recorded, erased and reproduced in a correct and stable manner. Further, since the fan is arranged on the spindle motor so as to be integrally rotated with the spindle motor when the opto-magnetic disc has been loaded on the apparatus, the construction of the apparatus becomes complex and the cost for manufacturing the apparatus increases.

Further, in the apparatus for information recording medium, generally, a disc-type information recording medium, which is contained in the cassette case, is inserted and ejected by an auto loading/ejecting mechanism with respect to a deck, which comprises the spindle motor, an optical pick-up means for recording and reproducing information on and from the disc, and a driving means for driving the optical pick-up means in a radius direction of the disc.

In such apparatus, the optical pick up means is constituted by fine optical members; and thus the pick up means is easily affected by a shock. Therefore, when the apparatus is, for instance, transported, or in other words, when information is not recorded, erased and reproduced in the apparatus, it is necessary to lock the pick up means in order to prevent that the pick up means is affected by vibration caused by the transportation thereof. In Japanese Patent Preliminarily Publication No. 1-253885, there is disclosed an apparatus which comprises a locking means which serves to lock the pick up means in response to the movement of the auto loading/ejecting mechanism. In the conventional apparatus, the locking means is urged against the pick up means to lock it when the disc is ejected from the apparatus.

However, in the conventional locking mechanism, it is arranged that a locking arm and a locking plate, which constitutes the looking mechanism, are urged against the pick up means at outside of a pair of slide shafts, by which the pick up means is supported to be movable in a radius direction of the disc. Therefore, a rotating deviation affects to the portion where the pick up means is urged against the locking mechanism. The rotating deviation causes a non-desired stress on the slide shafts or slide bearing provided in the pick up means, so that the pick up means could not be moved smoothly and the durability of the slide shafts and the bearings therefore are aggravated.

In a case that the pick up means is locked by such means that the pick up means is urged against a stopper, made by elastic material such as rubber, by the locking mechanism, when the pick up means has been locked for a long time, the elastic material of the stopper would be transformed and then the function of the stopper is decreased, or the elastic material of the stopper would be sometimes adhered to the pick up means, and thus the pick up means could not be driven. In a case that the pick up means is locked without being urged against the stopper, in order to solve the problem, it is necessary to make an accuracy for controlling the stop position of the pick up means high, so that the cost for manufacturing the apparatus becomes high.

Furthermore, in the apparatus for information recording medium, the information recording medium is contained in a cassette case in order to prevent the effect of dust. When the apparatus is loaded with the cassette case, which contains the recording medium, the cassette case is firstly held on a cassette case holder and transported in a horizontal direction and then transported in a vertical direction to be set up on a turn table, by which the information recording medium in rotated to record and/or reproduce information thereon and/or therefrom. On the cassette holder, a field unit is generally fixed to be integrally transported therewith.

However, there is a drawback in that the weight of the cassette holder becomes heavy due to the weight of the field unit, and therefore, the load generated on the cassette case holder and on a driving means for the cassette case holder is increased, when the cassette case holder is transported in the horizontal and vertical directions.

SUMMARY OF THE INVENTION

The first aspect of the present invention is to provide an apparatus for information recording medium which is appropriately constituted so as to prevent the increase of the temperature of the information recording medium due to the field coil without increasing the number of turns of the field coil and without making the size of the field coil large.

In order to solve the first object, an apparatus for information recording medium according to the first invention of the present application, in which an opto-magnetic disc is used as an information recording medium comprises:

driving means for rotating said opto-magnetic disc;

field coil means for applying a magnetic field on said opto-magnetic disc, being arranged on a base plate therefor so as to face to information recording surface of said opto-magnetic disc and said base plate comprising first and second opening in the vicinity of said field coil; and whereby a path for air current generated by a rotation of said opto-magnetic disc being formed by said first opening, a space formed between said field coil and said opto-magnetic disc and said second opening.

The second aspect of the present invention is to provide an apparatus for information recording medium, in which a non-desired force does not act on the slide shaft for movably supporting the optical pick up means and the slide bearing therefore, to increase the durabilities of the slide shaft and the slide bearing. The optical pick up means can be effectively locked on the apparatus without decreasing the function of the stopper means and without causing an adhesion of the stopper and the optical pick up means.

In order to solve the second object, the apparatus for information recording medium according to the second invention of the present application, in which information is recorded and/or reproduced with the aid of light beam, comprises:

loading and ejecting means for inserting and removing said information recording medium into and from the apparatus:

pick up means for illuminating said light beam on the information recording medium and for picking up a reflection light of said light beam reflected by the information recording medium, being arranged to be movable along a pair of sliding shafts;

driving means for driving said pick up means along said pair of sliding shafts;

locking means for locking said pick up means, being arranged to be movable in a direction parallel to an extending direction of said sliding shaft and to be extended in a direction perpendicular to said extending direction of said sliding shaft, being arranged on a driving plate of said loading and ejecting means, and comprising a connecting portion arranged to be able to be urged against said pick up means between said pair of sliding shafts;

energizing means for energizing said locking means in a direction that said connecting portion is urged against said pick up means, being arranged between both end portions of said locking means and said driving plate of said loading and ejecting means;

first stopper means for limiting a movement of said locking means, being arranged on said driving plate of said loading and ejecting means and being urged against both end portions of said locking means;

second stopper means for limiting a movement of said pick up means, being arranged on said driving plate of said loading and ejecting means;

whereby, said pick up means being locked between said connecting portion and said second stopper means in such a manner that said locking means is urged against second stopper means in response to an ejecting function of said loading/ejecting means and a space is formed between said second stopper means and said pick-up means.

The third aspect of the present application is to provide an apparatus for information recording medium, which is constituted such that the cassette case holder can be smoothly transported into the desired portion without making the construction of the apparatus complex.

In order to solve the third object, the third invention of the present application, in which an information recording medium is set up in the apparatus in such manner that a cassette case holder for holding a cassette case containing said information recording medium therein is arranged to be moved in a first direction along which said information recording medium is inserted in said cassette case, and then said cassette case holder is arranged to be moved in a second direction which is perpendicular to said first direction, comprises:

magnetic field generating means for applying a magnetic field on said information recording means, and being arranged to be separated from said cassette case holder;

holding means for holding said magnetic field generating means, being arranged to be rotatable about a third direction which is perpendicular to said first and second directions;

engaging means for selectively being engaged with said holding means by movements of said cassette case holder in said first and second directions, being arranged in said cassette case holder;

base plate;

driving plate being slidably arranged under said base plate;

auxiliary driving plate being slidably arranged on said driving plate;

whereby said magnetic field generating means is faced to said information recording medium with a predetermined space when the information recording medium is mounted in the apparatus.

BRIEF DESCRIPTION OF THE DRAWINGS

FIG. 3 is a perspective view illustrating a detail of a field unit provided in the apparatus shown in FIG. 1;

FIG. 4 is a cross sectional view cut by line I—I in FIG. 3, representing an air flow in the apparatus shown in FIG. 1;

FIG. 5 is a cross sectional view showing temperature measuring point in an experiment by which an effect of the first embodiment is confirmed;

FIG. 6 is a perspective view depicting a field unit of the second embodiment of an apparatus according to the present invention;

FIG. 7 is a plan view illustrating the third embodiment of an apparatus according to the present invention, in which the apparatus is loaded with a cassette case;

FIG. 8 is a plan view representing the third embodiment of an apparatus according to the present invention, in which the cassette case is ejected from the apparatus;

FIG. 9 is a partial perspective view showing the apparatus illustrated in FIG. 7;

FIG. 10 is a partial cross-sectional view depicting the apparatus illustrated in FIG. 7;

FIG. 11 is a partial cross-sectional view illustrating the apparatus represented in FIG. 8;

FIG. 12 is an analytical perspective view showing a fourth embodiment of the apparatus according to the invention;

FIGS. 14A to 14E are cross sectional views for explaining the function of the apparatus shown in FIG. 12.

DETAILED EXPLANATION OF THE PREFERRED EMBODIMENTS

Figure 1:
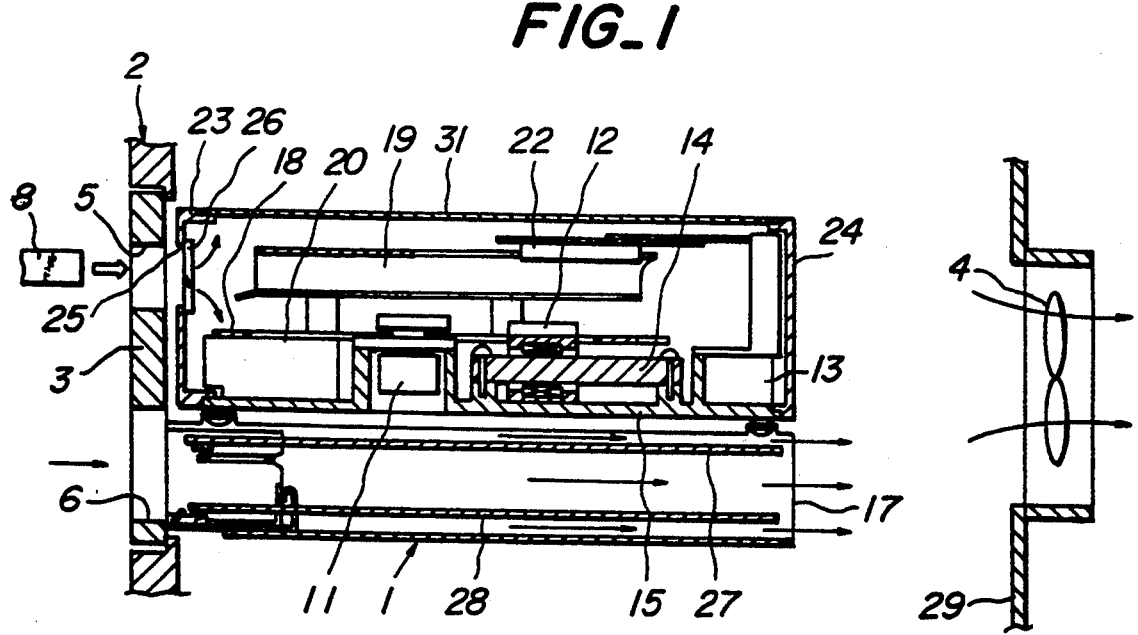
FIG. 1 is a longitudinal cross-sectional view showing the first embodiment of an apparatus according to the present invention.
Figure 2:
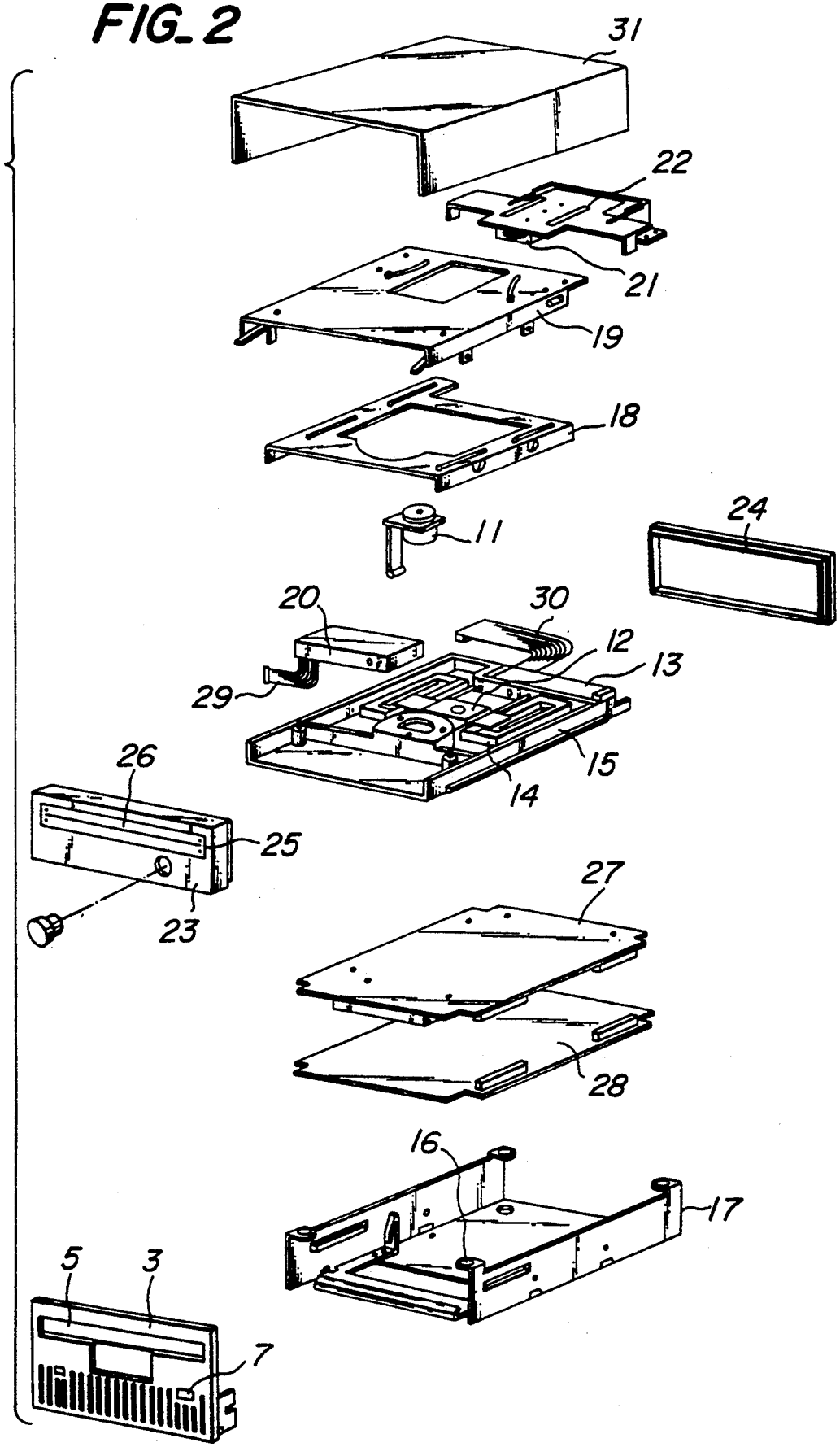
FIG. 2 is an analytical perspective view depicting the apparatus shown in FIG. 1.

FIG. 1 is a longitudinal cross-sectional view showing the first embodiment of the apparatus according to the present invention; and FIG. 2 is an analytical perspective view thereof. In this embodiment, the apparatus 1 is for an opto-magnetic disc. The apparatus 1 is mounted on an optical memory device 2 of an opto-magnetic disc sub-system construction or an optical memory device 2 of an internally stored type personal computer. The apparatus 1 is constructed such that an open air is introduced in the apparatus 1 from an opening formed in a front panel 3 by driving a cooling fan 4, which is provided on a rear panel 2a of the optical memory device 2; and the air introduced in the apparatus 1 blows out from a backside of the apparatus 1. In the front panel 3, there are provided an opening 5, through which a cassettes case 8 is inserted in and removed from the apparatus 1, and an opening 6, through which the air is introduced in the apparatus 1. On the front panel 3, there is further provided an ejecting button 7; the apparatus 1 is constituted such that the cassette case 8 mounted in the apparatus 1 can be ejected by pushing the ejecting button 7. In the apparatus 1, there is provided a deck unit 15, on which there are mounted a spindle motor 11 for rotating an opto-magnetic disc contained in the cassette case 8, a movable optical system 12 comprising an objective lens for recording, erasing and reproducing information with respect to the disc, a fixed optical system 13 comprising a semiconductor laser and photo detectors, and a voice coil motor 14 for driving the movable optical system 22 in a radius direction of the disc. The deck unit 15 is fixed to a frame 17 via a insulator 16. On the deck unit 15, there are further provided a holder unit 19 for holding and transporting the cassette case 8 via a loading driving plate 18; an auto-loading driving unit 20 for driving the loading driving plate 18 in front and back directions of the apparatus is arranged in front side of the deck unit 15; and a field unit 22 comprising a field coil 21 is arranged in back side of the deck unit 15. Furthermore, at front top of the deck unit 15, there is provided a front cover unit 23; and at back top of the deck unit 25, a rear cover 24.

The front cover unit 23 comprises an opening 25 so as to correspond to the opening 5, which is provided on the front panel 3 of the apparatus; and in the opening 25, there is provided a cover 26, which is arranged to serve to close the opening 25 by means of a energizing means (not shown) when the cassette case 8 has been mounted in the apparatus 1 or removed therefrom.

Under the deck unit 15, there are provided a first printed circuit board (PCB) 27 which comprises a control circuit for controlling a power of the semiconductor laser provided in the fixed optical system 13, a processing circuit for processing information read out from the opto-magnetic disc contained in the cassette case 8, and a controlling circuit for controlling the voice coil motor 14 for driving the movable optical system 12 in the radius direction of the opto-magnetic disc; and a second printed circuit board 28 which comprises a primary circuit for controlling the apparatus 1 on the basis of a command of a host computer, and circuits for analyzing the command and for correcting an error. The first and second printed circuit board 27 and 28 are arranged to be faced and separated from each other so as to form a duct, through which the air introduced from the opening 6 provided in the front panel 3 can be flowed. The first PCB 27 is held on a base member of the deck unit 15 and the second PCB 28 is connected to and held on the PCB 27 by means of a board-to-board connector which makes possible to electrically connect the first and second printed circuit boards 27 and 28 and to mechanically hold the second PCB 28 on the first PCB 27. Harnesses 29 and 30, which are extended from the deck unit 15, are held between the base member of the deck unit 15 and the front cover unit 23 or between the base member and the rear cover 24 via sealing members (not shown) made of rubber or sponge, respectively.

The members arranged on the deck unit 15 are covered with a top cover 31, the front cover unit 23, the rear cover 24 and the base member of the deck unit 15 to be protected from dusts.

FIG. 3 is a perspective view showing the detail of the field unit 22. As shown in FIG. 3, on a base plate 35, there is provided a field side yoke 36 on which the field magnetic 21 is arranged; and first and second openings 38 and 39 are formed in the base plate 35 in the vicinity of the field magnetic 21. The first opening 38 is arranged in an upper stream side of the rotating direction of the disc 37 shown by an arrow a, and the second opening 39 is arranged in a lower stream side thereof, respectively. On the base plate 35, there is provided a first flow guide 41 at the side of the first opening 38 in order to introduce the air flow from the first opening 38 into a space formed between the field coil 21 and the opto-magnetic disc 37 in an effective manner; and there is provided a second flow guide 42 at the side of the second opening 39 in order to exhaust the air flow from the space to the second opening 39 effectively. It should be noted that these flow guides 41 and 42 are formed to be inclined inside with respect to the surface of the base plate 35.

FIG. 4 is a cross sectional view showing an air flow generated when the opto-magnetic disc 37 is rotated by the spindle motor 11. As shown in FIG. 4, the air flow is exhausted to a space formed between the field unit 22 and the cover 31 from the second opening 39 via the space formed between the field coil 21 and the disc 37 and the second flow guide 42; additionally, the exhausted air flow is cooled by a heat radiation from the cover 31. On the other hand, the cooled air flow is introduced into the space formed between the field coil 21 and the disc 37 via the first opening 38 and the first flow guide 41, so that a circulated air flow path is formed in the cover 31 as shown in FIG. 4. Therefore, the temperature in the cover 31 becomes even by the circulated air flow, and thus the increasing of the temperature of the air surrounding the disc 37 caused by the field coil 21 can be effectively prevented and recording, erasing and reproducing information can be conducted in an effective and stable manner.

The present inventors experimentally measured a temperature inside of the cassette case 8. FIG. 5 is a cross sectional view showing a measuring point 45 at which the temperature is measured; the measuring point 45 is determined to be separated from the field coil 21 by 2 mm and from the front surface of the disc 37 by 1.2 mm. The first measurement was conducted under the condition that the flow guides 41 and 42 are not arranged; and the second and third measurements were conducted under the condition that the flow guides are arranged. The measurement result is shown in the following Table.

TABLE

| Flow guides 41, 42 | Material & thickness (mm) of cover 41 | Rotating number (rpm) of disc 37 | Temperature (°C.) at measurement point 55 |
| --- | --- | --- | --- |
| Not arranged | Aluminum 0.8 | 3600 | 20.5 |
| Arranged | Aluminum 0.8 | 3600 | 12.9 |
| Arranged | Aluminum 0.8 | 1800 | 13.6 |

It should be noted that since the opto-magnetic disc 37 is separated from the field coil 21 further than the measurement point 55, the temperature at the disc 37 is lower than the temperature at the measurement point 55.

As apparent from the experimental result, in the second and third experiment, in which the flow guides 41 and 42 are arranged, the air flow generated by the rotation of the opto-magnetic disc 37 is effectively circulated through the space formed between the field coil 21 and the disc 37, the second flow guide 42, the second opening 39, the space formed between the field unit 22 and the cover 31, the first opening and the first flow guide 41. Therefore, it is possible to prevent to increase the temperature of the air surrounding the disc 37 caused by the field coil 21 in an effective manner.

Further to the above, in the first embodiment, a driving mechanism portion of the apparatus 1, i.e. the mechanism portion provided in and on the deck unit 15 is almost completely closed by means of the front cover unit 23, the rear cover 24, cover 31 and the base member of the deck unit 15; therefore, when the open air is introduced from the opening 6 provided on the front panel 3 into the apparatus 1, the open air is not introduced into the driving mechanism portion. Thus, it is possible to prevent that the dust included in the open air is adhered to the disc 37 or optical members constituting of the movable optical system 12 and the fixed optical system 13, effectively. Therefore, the light amount of the light beam illuminated on the surface of the disc 37 is not decreased, so that information can be recorded/erased and reproduced on the disc 37 in a stable and correct manner during for a long time.

Further, in the first embodiment, since the space formed between the first base plate 27 and the second base plate 28 serves as a duct for the air current, which is introduced from the opening 6 of the front panel 3, it is certainly kept the radiation of the circuits mounted on the first and second base plates 27 and 28; and the function of the circuits provided on the base plates 27 and 28 is not be affected by dust, so that it is unnecessary to provide a filter in the opening 6 to make the open air clear. Therefore, it is possible to make the capacity of cooling fun 4 small by the pressure loss due to the filter. As a result, the cost for the apparatus can be made low.

Furthermore, the heat sources of the driving mechanism, i.e. the spindle motor 11, and the voice coil motor 14, are directly provided on the base member of the deck unit 15; therefore, the heat generated in the heat sources is effectively conducted to the base member via each connecting portion, which connects the heat sources and the base member; further since the open air introduced into the duct by the cooling fan 4 from the opening 6 flows through the duct, contacting with a lower surface of the base member of the deck unit 15, it is possible to effectively prevent to increase the temperature in the driving mechanism section.

In the first embodiment explained in the above, in the opening 25 of the front cover unit 23, there is provided a cover 26, which is closed even when the cassette case 8 is mounted in the apparatus 1. Therefore, since the deck unit 15 is almost completely covered by the front cover unit 23, the rear cover 24, the cover 31, the base member of the deck unit 15 and the cover 26, either when the cassette case 8 is mounted in the apparatus or when the cassette case 8 is removed therefrom, it can be possible to shut out the dust from the driving mechanism section of the apparatus.

FIG. 6 is a perspective view showing a partial construction of a variation of the field unit 22 according to the present invention. In the variation, the first flow guide arranged in the upper stream side of the disc 37 is omitted; and the second flow guide 42 is formed integrally with the field side yoke 36. The other construction is the same as that of the first embodiment. In the case that the flow guide arranged in the upper stream side of the disc 37 is omitted, the air flow generated by the rotation of the disc 37 can be effectively circulated through the space formed between the field coil 21 and the disc 37, the flow guide 42, the second opening 39, the space formed between the field unit 22 and the cover 31, and the first opening 38, it is possible to prevent to increase the temperature of the air surrounding the disc 37 in the same manner of the first embodiment. Further to this, since the flow guide 42 is integrally formed with the field side yoke 36, the number of the member constituting the apparatus is decreased and thus the cost for manufacturing the apparatus can be made down; additionally it is possible to assemble the members much easier.

As explained in detail in the above, according to the first invention of the present application, on the base plate of the field unit 35, there are provided first and second openings both sides of the field coil 21; the first opening is provided in an upper stream side of the rotating direction of the disc and the second opening in a lower stream side thereof, respectively; the flow guide is provided at least in the vicinity of the second opening so as to be inclined with respect to the surface of the disc; and thus there is formed a circulated pass for the air flow constituting of the first opening, the space formed between the field coil and the disc, the flow guide and the second opening. Therefore, it is possible to effectively prevent the increase of the temperature of the air surrounding the disc, without increasing the number of turn of the field coil, and therefore without making the size of the field coil large, so that the apparatus, by which information can be recorded, erased and reproduced in correct and stable manner, can be provided with a simple structure and a low cost.

The first invention is not limited to the above mentioned embodiment, but many variations or alternations can be applied. For instance, in the first embodiment, in the vicinity of the first and second openings 38 and 39, are provided first and second flow guides 41 and 42, respectively, but it may be possible to omit the first and second flow guides.

FIGS. 7 to 11 are schematic views showing the second embodiment of the apparatus according to the invention. It should be noted that FIGS. 7, 9 and 10 show the condition that the apparatus is loaded with the cassette case and FIGS. 8 and 11 show the condition that the cassette case is ejected from the apparatus.

In the second embodiment, on a deck base 51, there are provided a spindle motor 52 for rotating a disc-like optical information recording medium 53, which is contained in the cassette case 54, and an optical pick up means 55 for recording/reproducing or recording-/erasing/reproducing optical information with respect to the disc 53. The pick up means 55 comprises a movable optical system 55a and a fixed optical system 55b; the movable optical system 55a comprises a reflection prism 56, an objective lens 57, an actuator (not shown) for driving the objective lens 57 in a tracking direction, and position detecting means (not shown) for detecting the position of the objective lens 57 with respect to a neutral position thereof in the tracking direction; and the fixed optical system 55b comprises a semiconductor laser and photo detectors, etc. (not shown).

The movable optical system 55a is arranged on slide shafts 58a and 58b to be movable in a radial direction of the disc 53 via bearings 59a and 59b; and driven by a voice coil motor 60a and 60b. The movable range of the movable optical system 55a is determined by reckless stoppers 61a and 61b provided on the deck base 51 both at inner and outer circumference sides of the disc 53.

Between the slide shafts 58a and 58b and between the outer circumference side of the movable optical system 55a and the deck base 51, flexible substrates 62a and 62b are arranged so as not to affect the optical path formed between the movable optical system 55a and the fixed optical system 55b. To the actuator provided in the movable optical system 55a, is supplied a driving power therefor via one of the flexible substrate 62a; on the other hand, a position detecting signal supplied from the position detecting means of the movable optical system 55a is provided to a controlling unit (not shown) via the other flexible substrate 62b.

On the deck base 51, there are provided an auto-loading eject mechanism 65 and pins 66a and 66b for determining the position of both sides of the cassette case 53 when the cassette case is inserted in the apparatus. The auto-loading eject mechanism 65 comprising a driving plate 67 for inserting and removing the cassette case 53; the driving plate 67 comprises longitudinal guide holes 68a and 68b which are arranged to be extended in the cassette case inserting direction and to be engaged with guide pins 69a and 69b provided on the deck base 51; the driving plate 67 is supported to be movably in the cassette case inserting direction with respect to the deck base 51 and is driven in the direction by means of a motor 70 provided on the deck base 51 for loading and ejecting the cassette case via a gear mechanism 71 and a rack 72 provided on the driving plate 67.

In the second embodiment, on the driving plate 67 is provided a lock lever 75, which is extended in a direction perpendicular to the direction of the slide shafts 58a and 58b; in both sides of the lock lever 75, there are provided guide holes 76a and 76b, which are extended in the extending direction of the slide shafts; these guide holes are arranged to be engaged with guide pins 77a and 77b, which are provided on the driving plate 67, so that the lock lever 75 is supported on the driving plate 67 to be movably in the extending direction of the slide shafts. In the center portion of the lock lever 75, there is provided a connecting portion 78 which is arranged to be able to be urged against the movable optical system 55a between the slide shafts 58a and 58b. Further, between the lock lever 75 and the driving plate 67, there are provided energizing springs 79a and 79b to connect them; and the lock lever 75 is energized thereby in a direction that the connecting portion 78 is urged against the movable optical system 55a.

On the deck base 51, there are further provided stopper 81a and 81b, which are arranged to be urged against both sides of the lock lever 75 when the cassette case 54 is removed (FIGS. 8 and 11). As clearly shown in FIG. 11, the movable optical system 55a is locked between the connecting portion 78 of the lock lever 75 and the reckless stoppers 61a without urging the movable optical system 55a against the reckless stopper 61a when the cassette case 54 is removed from the apparatus. In other words, when the movable optical system 55a is locked, there is formed a space between the reckless stopper 61a and the movable optical system 55a. It should be noted that when the cassette case 54 is removed from the apparatus, the objective lens 57 is positioned at the inner circumference side of the disc 53, being out of the user area.

Under the condition that the movable optical system 55a is locked and the connecting portion 78 of the lock lever 75 is urged against the movable optical system 55a, the distance D between the reckless stoppers 61a and the movable optical system 55a is preferably determined to be minimum so as not to contact the reckless toppers 61a with the movable optical system 55a under taking the variation of the size of the reckless stoppers 61a, the variation of the distance between the reckless stoppers 61a, 61a and the stoppers 81a, 81b, the variation of the size of the lock lever 75, the variation of the movable optical system 55a, etc. into consideration.

As stated in the above, in the second embodiment, it is arranged such that the connecting portion 78 of the lock lever 75 can be urged against the movable optical system 55a, which is movably supported on a pair of slide shafts 78a and 78b and inside of the slide shafts 58a and 58b; and that the lock lever 75 is provided on the driving plate 67 via energizing springs 79a and 79b. Therefore, if the connecting portion 78 is urged against the movable optical system 55a when the cassette case 54 is ejected from the apparatus or when the apparatus is transported, the movable optical system 55a is not affected by vibration of the apparatus due to an elastic force of the energizing springs 79a and 79b; and a non-desired stress does not act on the bearings 59a, 59b of the movable optical system 55a and the slide shafts 58a, 58b. Therefore, the durability of the movable optical system 55a, the slide shafts 58a, 58b and the bearings 59a, 59b can be increased; and it is possible to use the movable optical system 55a for a long time in a stable and smooth manner.

In the second embodiment, the movable optical system 55a is arranged to be locked on the deck plate 51 between the connecting portion 78 of the lock lever 75 and the reckless stoppers 61a, 61a, which are arranged inner circumference side of the disc 53 but separated from the reckless stopper 61a, 61a, i.e. without being urged against the reckless stopper 61a, 61a; so that transformation of the elastic material of the reckless stopper 61a, 61a, such as rubber can be effectively prevent; and thus the problems can be solved that the function of the reckless stoppers 61a, 61a would be decreased and the elastic material is adhered with movable optical system 55a. Further, the space between the reckless stoppers 61a, 61a and the movable optical system 55a can be comparatively easily determined by providing the lock lever 75 on the driving plate 67 by means of the energizing springs 79a and 79b. Therefore, in the present invention, it is not desired to highly control the accuracy for stopping position of the lock lever 75, so that the manufacturing cost of the apparatus can be decreased.

In the second embodiment, the apparatus is applied to the separate-type optical pick up means, but the apparatus according to the second invention is effectively applied to the integrated-type pick up means. Additionally, the second invention can be applied to the apparatus for card-like information recording medium.

FIG. 12 is an analytical perspective view showing the third embodiment of the apparatus according to the present invention. The apparatus 101 comprises a base 102 having a square opening in its central portion; on the base 102 there is provided a cassette case holder 103 in which the cassette case 105 is held; and on the cassette case holder 103 is mounted a field holder 104. In the cassette case 105, an opto-magnetic disc is contained to be rotatable. Under the base 102, is arranged a driving plate 140, which is for moving the cassette case holder 103 in the vertical direction when the cassette case 105 is mounted therein.

The field holder 104 comprising a square opening in the central portion of the field holder proper, concave portions 106a, 106b in central portions of both side edges of the field holder 104, leg portions 107a, 107b in both front corners thereof, and engaging holes 108a, 108b, in the vicinity of the leg portions 107a, 107b, respectively. A field coil portion 109 comprising a field coil and yoke therefor is provided on the field holder 104 so as to extended over the square opening in a direction, along which the cassette holder 105 is inserted/removed. In the third embodiment, the field coil portion 109 is provided on the field holder 104 proper by means of connecting members, but it may be integrally provide the field coil portion 109 thereon.

Figure 13:
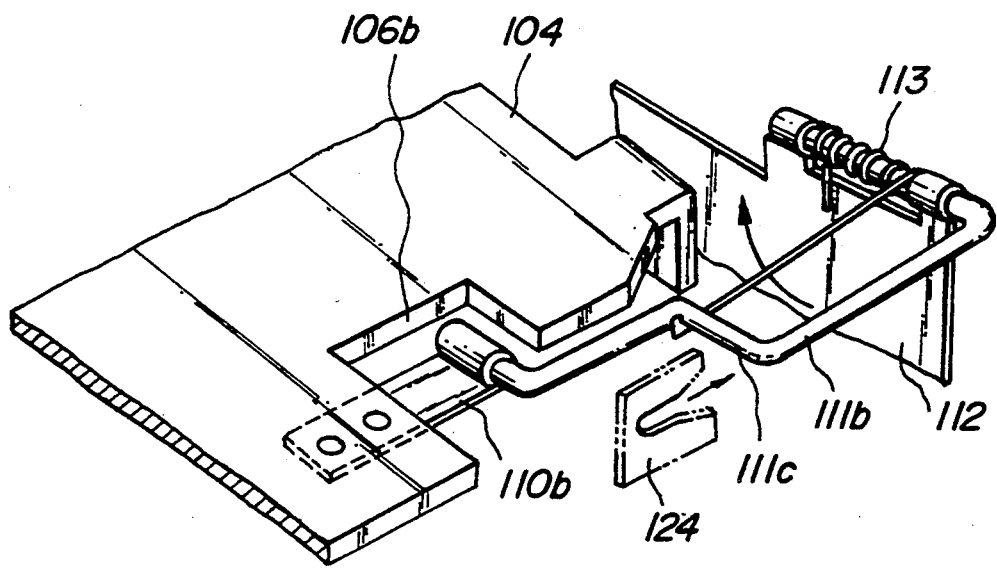
FIG. 13 is an enlarged-scale perspective view depicting a concave portion provided in a field holder of the apparatus shown in FIG. 12.

FIG. 13 is an enlarged scale perspective view showing the concave portion 106b of the field holder 104. It should be noted that in the opposite side of the field holder 104 proper is also provided other concave portion 106a, being symmetric with the concave portion 106b. As clear from FIG. 13, on one edge of the concave portion 106b there is provided a leaf spring 110b; and to the top end of the leaf spring 110b is engaged one end portion of a link 111b. Since the leaf spring 110b is provided in the concave portion 106b, the field holder 104 can be rotated in a vertical direction effectively. The other end portion of the link 111b is fixed to a field base 112, which is extended being substantially parallel with the back side plate of the field holder 104; the field holder 104 is rotatably arranged with respect to the field base 112. The link 111b is energized in an upper direction by means of a spring 113.

The cassette case holder 103 comprises a first opening 114 through which the cassette case 105 is inserted and removed, a second opening 115 on an upper surface of the cassette case holder 103; the second opening 115 is arranged to be faced to said field coil portion 109. At four corners of the upper surface, there are provided longitudinal concave portions 116, which are extended in the cassette case inserting direction; and when the cassette case holder 103 is loaded with the cassette holder 105, the cassette case holder 105 is urged against the base 102 by the concave portions 116.

At the back ends of inner side walls of the holder 103, there are provided ratchets 117 made of elastic material; when the cassette case 105 is inserted in the holder 103, the concaved portions (not shown) provided on the cassette case 105 are engaged with the ratchets 117 to be held thereby. At the back side corners of the holder 103 there are rotatably provided levers 118 via pins 119, respectively, in order to open and close a shutter of the cassette holder 105. One rotational end of the lever 118 is extended into the holder 103; and between the other rotated end of the lever 118 and the holder 103 is provided a spring 120 to energize the lever 118 outside. The lever 118 comprises a pin 121 having a collar portion. The pin 121 is engaged with an ark-like longitudinal hole 122; and the backwash of the lever 118 can be prevented by the pin 121.

At the back side of the holder 103, there is provided a switch 123 by which the fact that the cassette case 105 has been inserted in the holder 105 can be detected.

Furthermore, at the both sides of the back side of the holder 103, there are provided projections 124, respectively, to which said link 111a, 111b of the field holder 104 are engaged; additionally, at the central portion of the both sides of the holder 103, there are provided concave portions 125, respectively, and projections 126 in the vicinity thereof which are engaged with said holes 108a and 108b of the field holder 104, respectively.

At both sides of the base 102, there are provided first notch portions 130, which are extended in the cassette case inserting direction, and second notch portions 131, which are extended perpendicular thereto. The first notch portions 130 serve to guide projections 127, which are arranged on inner surfaces of leg portions 127a of the cassette case holder 103, in the cassette case inserting direction; and the second notch portions 131 serve to guide the projections 127 in the direction perpendicular to the cassette case inserting direction.

At the back side of the upper surface of the base 102, there are provided mount portions 132 on which the field base 112 is mounted. In the vicinity of the mount portions 132 and in the vicinity of the second notch portions 131, there are further provided mount portions 133, against which the leg portions 107 of the field holder 104 are urged. Under the base 102, is slidably arranged the driving plate 140 via pins 141. The driving plate 140 comprises longitudinal guide holes 142, which are extended in the cassette case inserting direction. In the guide holes 142, the pins 141 are movably inserted.

At front and back ends of each side wall of the driving plate 140, there are formed concave portions 143, respectively. Each edge of the side wall extended from which forms the concave portions 143, is arranged to be inclined with respect to the cassette case inserting direction. The concave portions 143 serve to guide the pins 127 of the cassette case holder 103 when the cassette case 105 is inserted in the apparatus.

Auxiliary plates 145 are slidably arranged on the side walls of the driving plate 140 by means of guide pins 146, which are respectively engaged with longitudinal guide holes 147 provided on the side walls of the driving plate 140; in the auxiliary plates 145, are also provided inclined edges 148 which are faced to said inclined edges 144 of the side walls of the driving plate 140.

Between the driving plate 140 and the auxiliary plate 145, is arranged a spring 149, by which the driving plate 140 and the auxiliary plate 145 are energized such that the distance between inclined edges 144 and 148 is made narrow. That is to say, the pin 127 provided on the by portions 127a of the cassette case holder 103 is held between the inclined edges 144 and 148 by means of energy of the spring 149.

At one side of the central opening of the base 102, is arranged a turn table 151, which is rotated by a spindle motor (not shown). On the turn table 151, the disc contained in the cassette case 105 is held and rotated thereby.

A driving means 161 for driving the driving plate 140 will be explained in the following. The driving means 161 comprises a plate-like holding member 162 made of stainless alloy, on which a worm wheel 163 is rotatably supported via a gear shaft 164. In the vicinity of the outer circumference of the worm wheel 163, is provided a longitudinal hole 165; and an elastic plate 166 comprising a pin 167, which is engaged with the longitudinal hole 165 and a longitudinal hole 168, which is provided in the front side of the driving plate 140, is rotatably arranged on the same shaft 164 of the worm wheel 163. To the worm wheel 163, is engaged a worm gear 169, at one end of which a pulley 170 is arranged.

The pulley 170 is connected to a pulley 173, which is provided on a rotating shaft of a motor 172, via a belt 171. The worm wheel 163 is rotated in a half circle manner by means of the motor 172 via the belt 170 and worm gear 169 in order to drive the driving plate 140. The holding member 162 is arranged on a base plate 174. It is arranged that the rotational position of the worm wheel 163 can be detected by switches 175 provided on the base plate 174.

At both sides of the front portion of the base plate 102, there are provided a pair of engage pins 181. These pins 181 are engaged with holes (not shown) provided in the cassette case 105 when the cassette case 105 is transported in a vertical direction, and serve to determine the position of the cassette case 105 with respect to the base 102.

The function of the third invention will be explained in the following. FIG. 14A shows the condition that the cassette case 105 has not been mounted yet. The field holder 104 is urged against a top cover 191 in a horizontal manner by the spring 113, which is provided to the link 111. In this case, the pin 127 provided on the side walls of the cassette case holder 103 are held in the concave portions 143 provided in the side wall of the driving plate 140, which is energized by the spring 149 arranged between the driving plate 140 and the auxiliary plate 145. The driving plate 140 is moved to the front side of the apparatus. Therefore, the cassette case holder 103 is also moved to the front side with respect to the base 102 as far as possible. It should be noted that the cassette case holder 103 is arranged to be separated from the upper surface of the base 102 by a pre-determined distance.

FIG. 14B shows the condition that the cassette case 105 is being inserted in the cassette case holder 103. After the cassette case 105 has been mounted in the cassette case holder 103, the cassette case holder 103 containing the cassette case 105 is moved to the back side of the base 102. When the cassette case holder 103 is moved in the horizontal direction, a bent portion 111c of the link 111 (see FIG. 13) is engaged with the projection 124 provided on the cassette case holder 103. In this case, the driving plate 140 is moved to the backward direction, opposing against the force of the spring 149; then the movement of the pin 127 is limited by the inner wall of the engaged portion 133 of the base 102. Then, in accordance with the movement of the driving plate 140 and the auxiliary plate 145, the pins 127 are urged by the inclined edge 148 of the auxiliary plate 145 to be moved in a vertical direction, being urged against one side wall of the concave portion 133.

In such manner, the link 111 is engaged to the projection 124; then the cassette case holder 103 is moved in a vertical direction. As shown in FIG. 14C, when the projection 124 is moved down in accordance with the movement of the cassette case holder 103, the link 111 is rotated down (in a counterclockwise direction) about a fulcrum 192. In this case, the pins 127 are held between the inclined edges 144 and 148; and then when the driving plate 140 is further moved backwardly, the pins 127 are urged against the inclined edge 144 downwardly in a vertical direction by means of the spring 149. The pins 127 are moved downwardly along the space formed between the inclined edges 144 and 148 by a resultant of the force of the spring 149 and the reaction force of the engage portion 133. The cassette case holder 103 is moved down until the lower surface of the cassette case contained therein is made contact with the pins 181 and the upper surface of the cassette case 105 is made contact with the concave portions 116 formed in the cassette case holder 103.

FIG. 14D shows the condition just before the downwardly movement of the cassette case holder 103 is finished. The leg portions 107a and 107b of the field holder 104 are urged against the projected portions 133 formed in the base 102; and the field holder 104 is kept to be in a horizontal manner. The field holder 104 should be positioned being parallel to the upper surface of the cassette holder 103. The relative position of the cassette case holder 103 and the field holder 104 is properly determined by engaging the pins 126 provided on the cassette case holder 103 with the holes 108 provided in the field holder 104.

Further, FIG. 14E shows the condition that the downwardly movement of the cassette case holder 103 has been finished. When the movement of the cassette case holder 103 has been finished, the link 111 is further rotated down to press down the leaf spring 110. Since the field holder 104 is pressed down by the leaf spring 110, it can be prevent that the field holder 104 is risen due to the vibration of the apparatus, etc. The position of the cassette case 105 with respect to the base 102 is determined as explained in the above; and the disc 193 contained in the cassette case 105 is cramped on the turn table 151. The field coil portion 109 faces to the recording area formed on the surface of the disc 193 to realize the condition that information can be recorded-/erased/reproduced thereon/therefrom. It should be noted that in the driving means 161, a rotational position of the worm wheel, which corresponds to the condition that the loading operation of the cassette case 105 has been finished, is detected by the limit switches 175; and then the rotation of the worm wheel is stopped.

The third invention can be applied to not only the apparatus, in which the magnetic field applying device is provided, for opto-magnetic information recording medium, but also the apparatus for optical information recording medium. Additionally, the third invention can be applied to not only the apparatus using an optical pick up means, but also the apparatus for magnetic information recording medium.

What is claimed is:

1. An apparatus for information recording medium in which an opto-magnetic disc is used as an information recording medium, comprising:

driving means for rotating said opto-magnetic disc; and field coil means for applying a magnetic field on said opto-magnetic disc, said field coil means being positioned to face the information recording surface of said opto-magnetic disc when said opto-magnetic disc is disposed in said apparatus; and said base plate comprising first and second openings in a vicinity of said field coil, said first and second openings being shaped and positioned so as to form part of a path of air current generated by a rotation of said opto-magnetic disc;

said path comprising said first opening, a space between said field coil and said opto-magnetic disc, when said opto-magnetic disc is disposed in said apparatus, and said second opening.

2. An apparatus for information recording medium according to claim 1, further comprising:

guide means for guiding said air current, said guide means, being arranged in a vicinity of both said first and second openings.

3. An apparatus for information recording medium according to claim 2, wherein:

said guide means comprises flow guides which are arranged to be inclined with respect to the surface of the opto-magnetic disc, said first and second openings being shaped and positioned so as to form part of a path of air current generated by a rotation of said opto-magnetic disc.

4. An apparatus for information recording medium according to claim 1, further comprising:

cover means, having a closing cover through which a cassette case containing said opto-magnetic disc can be inserted and removed, for almost completely covering said driving means and said field coil.

5. An apparatus for information recording medium according to claim 1, further comprising:

base means and said field coil; a first printed circuit board disposed under the base means for driving said driving means and said field coil and a second printed circuit board disposed under the base means for controlling a function of said driving means, and said first and second printed circuit boards being arranged so as to be separated from each other to form a duct through which an open air is introduced.

6. An apparatus for information recording medium according to claim 5, wherein:

said driving means comprises a spindle motor, which is directly arranged on said base means.

7. An apparatus for information recording medium according to claim 4, wherein:

said closing cover is arranged to close the apparatus when said cassette case is mounted in the apparatus.

8. An apparatus for information recording medium, in which information is recorded and/or reproduced with the aid of a light beam, comprising:

loading and ejecting means for inserting and removing said information recording medium into and from the apparatus;

pick up means for illuminating said light beam on the information recording medium and for picking up a reflection light of said light beam reflected by the information recording medium, being arranged to be movable in a first direction along a pair of sliding shafts;

driving means for driving said pick up means in said first direction along said pair of sliding shafts;

locking means for locking said pick up means, being arranged to be movable in said first direction and to be extended in a second direction perpendicular to said first direction, being arranged on a driving plate of said loading and ejecting means, and comprising a connecting portion arranged to be able to be urged against said pick up means between said pair of sliding shafts;

energizing means for energizing said locking means in a direction that said connecting portion is urged against said pick up means, being arranged between both end portions of said locking means and said driving plate of said loading and ejecting means;

first stopper means for limiting a movement of said locking means, being arranged on said driving plate of said loading and ejecting means and being urged against both end portions of said locking means;

second stopper means for limiting a movement of said pick up means, being arranged on said driving plate of said loading and ejecting means;

whereby, said pick up means being locked between said connecting portion and said second stopper means in such a manner that said locking means is urged against second stopper means in response to an ejecting function of said loading/ejecting means and a space is formed between said second stopper means and said pick up means.

9. An apparatus for information recording medium according to claim 8, in which:

said pick up means comprises a movable optical system comprising an objective lens, a reflection prism, an actuator for driving said objective lens in focusing and tracking directions; and a fixed optical system comprising a semiconductor laser and photo detectors; and said movable optical system is arranged to be driven along said pair of sliding shafts.

10. An apparatus for information recording medium according to claim 8, in which:

said pick up means comprises an objective lens, a reflection prism, an actuator for driving said objective lens in focusing and tracking directions, a semiconductor laser and photodetectors; and said pick up means as a whole is driven along said pair of sliding shafts.

11. An apparatus for information recording medium according to claim 8, in which:

disc-like information recording medium is used as the information recording means.

12. An apparatus for information recording medium according to claim 8, in which:
   card-like information recording medium is used as the information recording means.

13. An apparatus for information recording medium according to claim 8, in which;
   said driving means comprises a voice coil motor for driving said pick up means; and a movement range of said pick up means is limited by said second stopper means.

14. An apparatus for information recording medium according to claim 8, wherein:
   said loading and ejecting means comprises a driving plate for inserting and removing a cassette case into and from the apparatus; said driving plate is supported to be movable in a direction that said cassette case is inserted and removed.

15. An apparatus for information recording medium according to claim 14, wherein:
   said loading and ejecting means comprises a motor, a gear mechanism and a rack mechanism; said driving plate is driven by said motor via said gear mechanism and said rack mechanism in said direction that said cassette case is inserted and removed.

16. An apparatus for information recording medium according to claim 8, wherein:
   said locking means comprises guide holes which are arranged in both sides of said locking means, respectively, and extended in said first direction; said driving plate comprises guide pins so as to be engaged with said guide holes; whereby said locking means is supported on said driving plate to be movable in said first direction;
   said connecting portion is provided in a center portion of said looking means so as to be urged against said pick up means;
   said energizing means comprises springs which are arranged between both end portions of said locking means and said driving plate, by which said locking means is energized in a direction that the connecting portion is urged against said pick up means.

17. An apparatus for information recording medium according to claim 8, wherein:
   said pick up means is locked in such a manner that said space formed between said second stopper means and said pick up means becomes minimum but said pick up means is not made contacted with said second stopper means under the condition that said contacting portion of said lock lever is urged against said pick up means.

18. An apparatus for information recording medium in which an information recording medium is set up in the apparatus in such manner that a cassette case holder for holding a cassette case containing said information recording medium therein is arranged to be moved in a first direction along which said information recording medium is inserted in said cassette case, and then said cassette case holder is arranged to be moved in a second direction which is perpendicular to said first direction, comprising;
   magnetic field generating means for applying a magnetic field on said information recording means, and being arranged to be separated from said cassette case holder;
   holding means for holding said magnetic field generating means, being arranged to be rotatable about a third direction which is perpendicular to said first and second directions;
   engaging means for selectively being engaged with said holding means by movements of said cassette case holder in said first and second directions, being arranged in said cassette case holder;
   base plate;
   driving plate being slidably arranged under said base plate;
   auxiliary driving plate being slidably arranged on said driving plate;
   whereby said magnetic field generating means is faced to said information recording medium with a predetermined space when the information recording medium is mounted in the apparatus.

19. An apparatus for information recording medium according to claim 18, wherein:
   said holding means comprises a field holder and a link; one end portion of said link is arranged on said field holder via a leaf spring; and the other end of said link is rotatably arranged on said base plate: and
   said link is fixed to said cassette case holder and energized in an upper direction by means of a coil spring.

20. An apparatus for information recording medium according to claim 18, wherein:
   said cassette case holder comprises projection portions which are engaged to said link;
   whereby when said cassette case holder is moved in a horizontal direction, said link is engaged with said projection portion thereof.

21. An apparatus for information recording medium according to claim 18, wherein:
   said base plate comprises first grooves extended in a cassette case inserting direction and second grooves extended in a direction perpendicular to said cassette case inserting direction; these grooves are serve to guide said cassette case holder in said first and second directions.

22. An apparatus for information recording medium according to claim 18, wherein:
   said driving plate comprises a concave portion and first inclined portion which is extended from said concave portion;
   said auxiliary plate comprises second inclined portions, which are faced to said first inclined portions;
   an elastic member is arranged between said driving plate and said auxiliary plate to energize said driving plate and said auxiliary plate in a direction that a distance between said first inclined portions and said second inclined portions becomes small;
   pins arranged on said cassette case holder are held between the first and second inclined portions by means of an energizing force of said elastic member.

23. An apparatus for information recording medium according to claim 22, wherein:
   said apparatus comprises a driving means for driving the driving plate; and
   a switching means for detecting the fact that said information recording medium contained in a cassette case is loaded in a proper position to record and/or reproduce information on and/or from said information recording medium, whereby, it is arranged such that when said information recording medium is loaded in the proper portion, the movement of the driving plate is stopped.

* * * * *